(12) United States Patent
Lee (10) Patent No.: US 11,989,981 B2
(45) Date of Patent: May 21, 2024

(54) SYSTEM AND METHOD FOR INSPECTION ADVANCED DRIVER ASSISTANCE SYSTEM USING MOBILE MANIPULATOR

(71) Applicants: HYUNDAI MOTOR COMPANY, Seoul (KR); KIA CORPORATION, Seoul (KR)

(72) Inventor: Mingyu Lee, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 197 days.

(21) Appl. No.: 17/540,651

(22) Filed: Dec. 2, 2021

(65) Prior Publication Data

US 2022/0343697 A1 Oct. 27, 2022

(30) Foreign Application Priority Data

Apr. 26, 2021 (KR) .................... 10-2021-0053724

(51) Int. Cl.
G07C 5/00 (2006.01)
B25J 5/00 (2006.01)
G05D 1/00 (2024.01)
G07C 5/08 (2006.01)

(52) U.S. Cl.
CPC .......... *G07C 5/008* (2013.01); *G05D 1/0088* (2013.01); *G05D 1/0094* (2013.01); *G05D 1/0212* (2013.01); *G05D 1/0231* (2013.01); *G07C 5/0808* (2013.01); *B25J 5/007* (2013.01)

(58) Field of Classification Search
CPC ...... G07C 5/008; G07C 5/0808; G06Q 50/04; G01M 99/008; G01M 17/007; G01D 18/00; B62D 65/005; G01S 7/40; G01S 7/497; G05D 1/0231; G05D 1/0088; G05D 1/0094; G05D 1/0212; G05D 2201/0213; B25J 5/007; H04N 17/002
See application file for complete search history.

(56) References Cited

U.S. PATENT DOCUMENTS

| | | | |
|---|---|---|---|
| 2017/0186177 A1* | 6/2017 | Nagori | G06T 7/579 |
| 2020/0130188 A1* | 4/2020 | Lawrence | G01S 7/4972 |
| 2021/0166423 A1* | 6/2021 | Cejka | F16M 11/24 |
| 2021/0318117 A1* | 10/2021 | Strege | G06K 7/1443 |
| 2021/0398271 A1* | 12/2021 | Lee | G06T 7/001 |
| 2022/0042794 A1* | 2/2022 | Cejka | G01S 7/497 |

* cited by examiner

*Primary Examiner* — Anne Marie Antonucci
*Assistant Examiner* — Wesam Nmn Almadhrhi
(74) *Attorney, Agent, or Firm* — MCDONNELL BOEHNEN HULBERT & BERGHOFF LLP (57) ABSTRACT

A system for inspecting an advanced driver assistance system (ADAS) using a mobile manipulator (MMP) of a vehicle factory includes the MMP including an autonomous mobile robot (AMR) coupled integrally with a manipulator that changes a position of a calibration target unit mounted to inspect the ADAS of a vehicle; and a server that transmits an ADAS inspection command to the MMP through an access point when the vehicle entering an inspection process is recognized and a centering of the vehicle is completed, in which the MMP inspects a mounting state of an ADAS sensor by moving the calibration target unit to a target position while moving to at least one of the front, rear and both sides of the vehicle according to the ADAS inspection command.

15 Claims, 5 Drawing Sheets

<CONVENTIONAL INSPECTION PROCESS>

SYSTEM AND METHOD FOR INSPECTION ADVANCED DRIVER ASSISTANCE SYSTEM USING MOBILE MANIPULATOR

CROSS REFERENCE TO RELATED APPLICATIONS

This application claims priority to and the benefit of Korean Patent Application No. 10-2021-0053724 filed in the Korean Intellectual Property Office on Apr. 26, 2021, the entire contents of which are incorporated herein by reference.

BACKGROUND

(a) Field

The present disclosure relates to a system and a method for inspecting an advanced driver assistance system (ADAS) using a mobile manipulator (MMP), and more particularly, to a system and a method for inspecting an ADAS using an MMP for inspecting an ADAS operation sensor of a vehicle through a mobile calibration target in a vehicle factory.

(b) Description of the Related Art

In general, an advanced driver assistance system (ADAS) function that monitors the front and rear and surrounding conditions of a vehicle is applied to the vehicle for driving assistance and safety of a driver.

Accordingly, a vehicle factory operates an ADAS inspection process that corrects errors of various sensors (hereinafter referred to as ADAS sensors) such as radar, laser, camera, and lidar required for the ADAS function.

Figure 5:
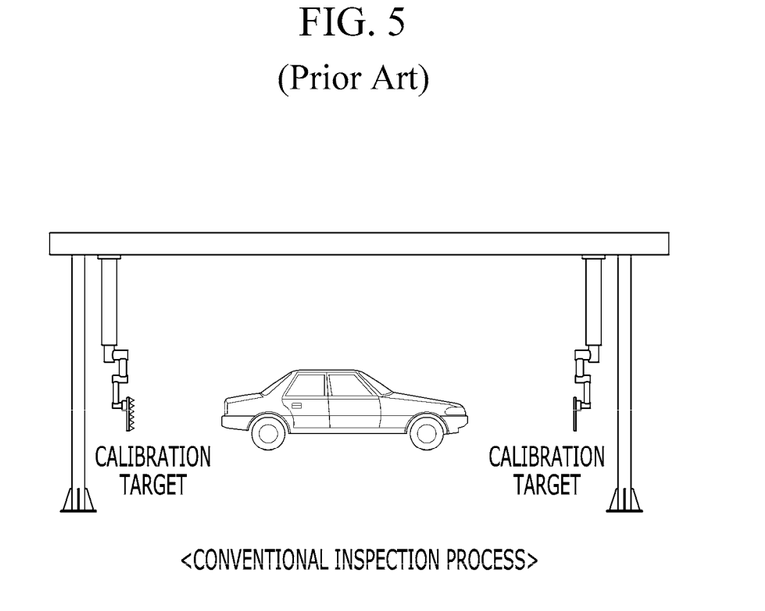
FIG. 5 schematically illustrates an ADAS inspection method in a conventional vehicle factory.

FIG. 5 schematically illustrates an ADAS inspection method of a conventional vehicle factory.

Referring to FIG. 5, a conventional ADAS sensor performs an inspection by using a fixed target that transmits electromagnetic waves, and electromagnetic waves transmit to a fixed calibration target in a state of being mounted on a vehicle and measures a reflected signal to correct an error.

However, since the conventional ADAS inspection has to secure a certain distance between the sensor mounted on the vehicle and the fixed calibration target and takes up a lot of space, there is a limit to scalability when inspecting the additional functions. For example, in the conventional ADAS inspection process, multi-calibration targets are configured according to the type of ADAS sensor, and are operated as a type that adjusts the position using a cylinder or servomotor. ADAS inspection conditions are different depending on the vehicle model and specifications, and flexible changes are required in the process operation due to the additional ADAS function inspection. However, in the case of the conventional fixed operation method, it is difficult to respond flexibly because additional construction such as frame extension is required due to mechanical movement distance limitation and space limitation, etc., and there is a problem that the considerable amount of manpower and time are required for the commissioning.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide a system and a method for inspecting an advanced driver assistance system (ADAS) using a mobile manipulator (MMP) that inspects a mounting state for each position of an ADAS sensor applied to a vehicle by using a mobile calibration target mounted on the MMP.

An exemplary embodiment of the present disclosure provides a system for inspecting an advanced driver assistance system (ADAS) using a mobile manipulator (MMP), the system including the MMP including an autonomous mobile robot (AMR) coupled integrally with a manipulator that changes a position of a calibration target unit mounted to inspect the ADAS of a vehicle, and a server that transmits an ADAS inspection command to the MMP through an access point when the vehicle entering an inspection process is recognized and a centering of the vehicle is completed, in which the MMP inspects a mounting state of an ADAS sensor by moving the calibration target unit to a target position while moving to at least one of the front, rear and both sides of the vehicle according to the ADAS inspection command.

The server may recognize the entrance of the vehicle through an OBD terminal connected to the access point and check whether or not an inspection position of the vehicle is centered through a programmable logic controller (PLC).

The server may collect vehicle information (ID) through the OBD terminal and check information on the ADAS sensor applied according to the vehicle model/specification matched to the vehicle information (ID).

The MMP may include the AMR that moves to a target position by itself while detecting the surroundings through an autonomous driving sensor, the manipulator for moving the calibration target unit mounted on an end effector to the target position by changing positions according to a control signal, a vision sensor unit for scanning a region of interest (ROI) marker to check a position deviation of the AMR moved to the target point, a communication unit connecting wireless communication with at least one of the OBD terminal and the server through the access point, and a control unit for inspecting a mounting state for each position of the ADAS sensor applied to the vehicle using the calibration target unit.

The calibration target unit may include a calibration target installed on one side of a rectangular panel and a calibration pattern installed on the opposite side according to an ADAS inspection method and the type of the ADAS sensor.

The manipulator may be rotatably mounted with the calibration target unit by the rotating devices.

The vision sensor unit may include at least one vision sensor, and may be attached to a side surface of the calibration target unit.

The control unit may include an inspection control module for identifying an ADAS inspection item according to the vehicle model and specification matched with the vehicle information (ID) and movement information of the calibration target unit corresponding to the corresponding ADAS sensor, an AMR control module for moving the AMR to the target point when receiving the movement information of the calibration target unit from the inspection control module, and a robot control module for moving the calibration target unit to a final target position by controlling the position of the manipulator with a final target position value received from the AMR control module.

The AMR control module may derive the final target position value acquired by compensating for the position deviation checked through the vision sensor unit and transmit the final target position value to the robot control module.

Another embodiment of the present disclosure provides a method for inspecting an advanced driver assistance system (ADAS) using a mobile manipulator (MMP) in which a manipulator that changes a position of a calibration target unit mounted to inspect the ADAS of a vehicle and an autonomous mobile robot (AMR) are coupled, the method including a) receiving vehicle information (ID) of a vehicle in which centering is completed by entering an inspection process from a server, b) detecting an ADAS inspection item according to the vehicle model and specification of the vehicle information (ID) and moving to a target point through the AMR, c) deriving a final target position value by compensating for a position deviation of the AMR based on an origin coordinate recognized by scanning a region of interest (ROI) marker through a vision sensor unit when arriving at the target point, and d) inspecting a mounting state according to an operation of the ADAS sensor after moving the calibration target unit by controlling attitude of the manipulator with the final target position value.

The compensating for the position deviation of the AMR in the step c) may include, when the vision sensor unit includes vision sensors installed for each X, Y, and Z axis, compensating for the 6-axis position (X, Y, Z, Yaw, Pitch, Roll) through the vision sensor of each axis.

The compensating for the position deviation of the AMR in the step c) may include, when the vision sensor unit includes vision sensors installed on two axes among X, Y, and Z axes, compensating for the 6-axis position (X, Y, Z, Yaw, Pitch, Roll) after calculating the specific position and angle through the vision sensors of the two axes.

The compensating for the position deviation of the AMR in the step c) may include, when the vision sensor unit includes 2D and 3D vision, compensating for the 6-axis position (X, Y, Z, Yaw, Pitch, Roll) using the 3D vision after moving to a position recognized by the 3D vision by using the 2D vision when the field of view of the 2D and 3D vision is not sufficient.

The compensating for the position deviation of the AMR in the step c) may include, when the vision sensor unit includes a 3D vision sensor, compensating for the 6-axis position (X, Y, Z, Yaw, Pitch, Roll) using the 3D vision after moving to a position recognized by the 3D vision sensor.

The step d) may include selectively positioning a calibration target or a calibration pattern of the calibration target unit by operating rotating devices of the manipulator according to the corresponding ADAS inspection method and the type of the ADAS sensor.

The step d) may include performing a front ADAS inspection including at least one of a multi-function camera (MFC) inspection step, a smart cruise control inspection (SCC) inspection step, and a head up display (HUD) inspection step according to the inspection item in a state of being positioned in front of the vehicle.

The method may further include, after the performing of the front ADAS inspection, performing a rear ADAS inspection including at least one of a blind spot detection (BSD) inspection step, a forward collision warning (FCW) inspection step, and a parking assist system (PAS) inspection step according to the inspection item after moving to a target point for ADAS inspection of a rear of the vehicle.

According to an embodiment of the present disclosure, by implementing a method for inspecting an ADAS through a mobile calibration target using an MMP, a flexible operation is possible without restrictions on position and space, and it is possible to shorten the construction period and reduce costs.

Further, by selectively providing a calibration target and a calibration pattern using one MMP without complex frame facilities and calibration target fixed structures of the calibration target, it is possible to secure smart factory element technology that may simplify the facilities and flexibly respond to various ADAS inspections for each vehicle model/specification.

DETAILED DESCRIPTION

In the following detailed description, only certain exemplary embodiments of the present disclosure have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. Like reference numerals designate like elements throughout the specification.

Throughout the present specification, unless explicitly described to the contrary, the word "comprise" and variations such as "comprises" or "comprising", will be understood to imply the inclusion of stated elements but not the exclusion of any other elements. In addition, the terms "-er", "-or", and "module" described in the specification mean units for processing at least one function and operation, and can be implemented by hardware components or software components, and combinations thereof.

Throughout the present specification, terms first, second, A, B, (a), (b), and the like may be used to describe various components, but the components are not limited by the terms. These terms are only for distinguishing the components from other components, and the essence, sequence, or order of the components is not limited by the terms.

Throughout the present specification, when a component is referred to as being "coupled" or "connected" to another component, it should be understood that one component may be directly coupled or connected to another component, but other components may exist between one component and another component. On the other hand, when one component is referred to as being "directly coupled to" or "directly connected to" another component, it should be understood that other components do not exist between one component and another component.

Throughout the present specification, the terms used are only used to describe specific exemplary embodiments, and are not intended to limit the present disclosure. Singular forms are to include plural forms unless the context clearly indicates otherwise.

Throughout the present disclosure, it should be understood that the terms "include" and "have" are intended to designate that a feature, number, step, operation, component, part, or combination thereof described in the specification exists, but do not preclude the possibility of addition or existence of one or more other features or numbers, steps, operations, components, parts, or combinations thereof.

Unless defined otherwise herein, all terms used herein, including technical or scientific terms, have the same meaning as commonly understood by one of ordinary skill in the art to which the present disclosure belongs. Terms such as those defined in commonly used dictionaries should be interpreted as being consistent with the contextual meaning of the relevant art, and are not to be construed in an ideal or overly formal sense unless explicitly defined herein.

Now, an ADAS inspection system using an MMP and a method thereof according to an exemplary embodiment of the present disclosure will be described in detail with reference to the drawings.

Figure 1:
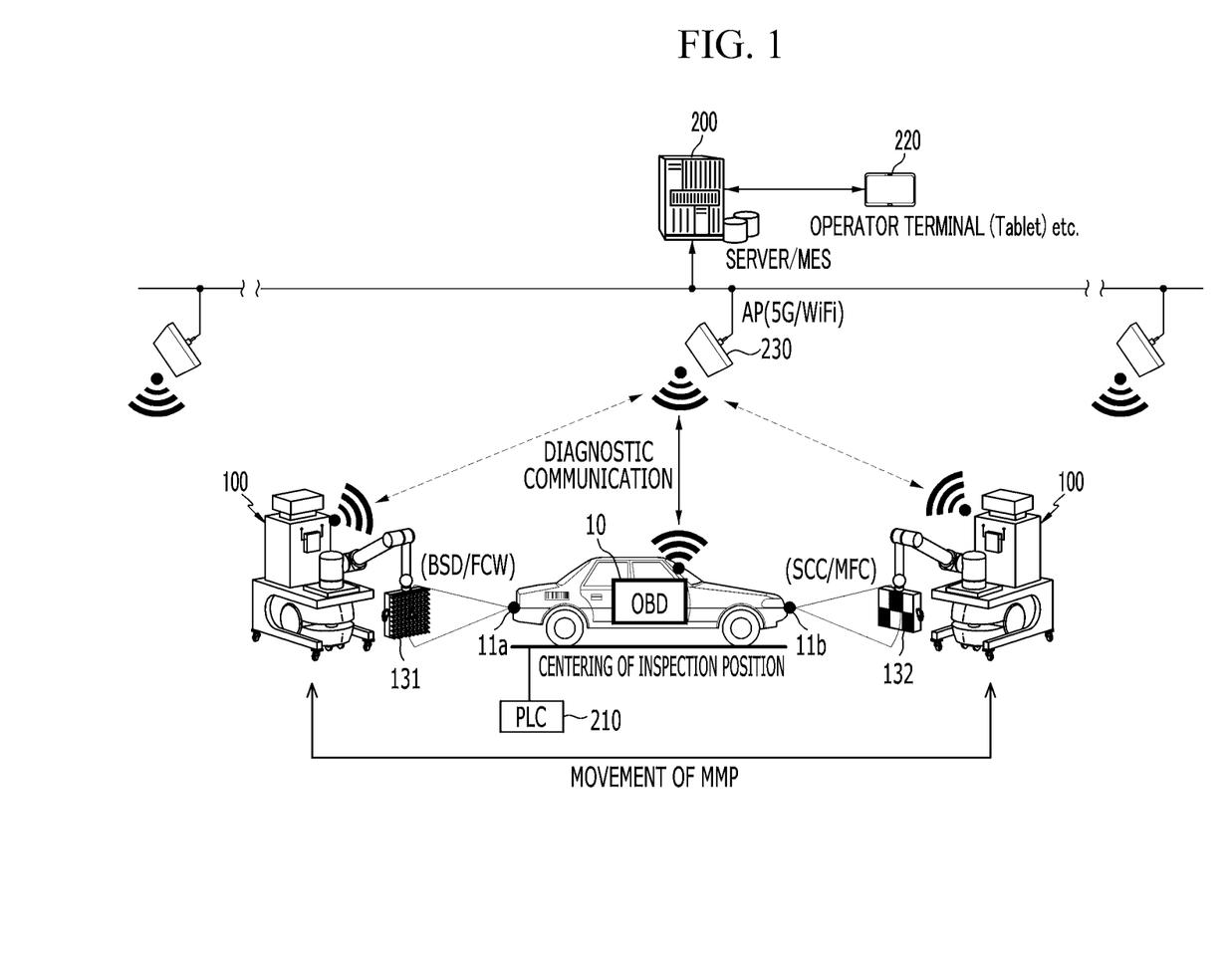
FIG. 1 schematically illustrates a configuration of an ADAS inspection system using an MMP according to an exemplary embodiment of the present disclosure.

FIG. 1 schematically illustrates a configuration of an ADAS inspection system using an MMP according to an exemplary embodiment of the present disclosure.

Referring to FIG. 1, an advanced driver assistance system (ADAS) inspection system according to an exemplary embodiment of the present disclosure includes an OBD terminal 10 mounted on a vehicle, a mobile manipulator (MMP) 100, and a server 200.

The vehicle may be equipped with at least one ADAS sensor 11 of a radar, a lidar, and a camera according to an ADAS applied in a preceding process. The ADAS sensors 11a and 11b are mounted at a plurality of locations designated in the vehicle, and mounting positions, numbers, and specifications may be different depending on a vehicle model/specification.

The ADAS includes functions such as Smart Cruise control (SCC), Multi-Function Camera (MFC), Forward Collision Warning (FCW) and Blind Spot Detection (BSD), Automatic Emergency Brake (AEB), and Parking Assist System (PAS). Further, the vehicle may be applied with an autonomous driving system of a higher level than the ADAS in the preceding process depending on the vehicle model and may be mounted with an autonomous driving sensor for the autonomous driving system. Correspondingly, the ADAS inspection system according to an exemplary embodiment of the present disclosure may inspect the functions and the sensor added to the vehicle in a mobile manner. Hereinafter, in the present disclosure, the ADAS inspection includes a series of tasks of detecting and correcting whether a related ADAS sensor operates and a mounting error thereof according to an execution of the ADAS function.

The OBD terminal 10 is mounted on a vehicle produced in a vehicle factory, and controls the ADAS operation of the vehicle according to communication with an external device and an external command.

When the vehicle on which the OBD terminal 10 is mounted enters an inspection process, the OBD terminal 10 connects diagnostic communication with the server 200 through an access point (AP) 230 in the corresponding area. The access point 230 may relay wireless LAN (WiFi) or wireless mobile communication (5G).

The OBD terminal 10 transmits vehicle information (ID) to the server 200 through the access point 230 of the inspection process. In addition, the OBD terminal 10 may receive an ADAS inspection control signal according to the vehicle model and specification based on the vehicle information (ID) from the server 200.

In addition, the OBD terminal 10 may communicate with an ADAS function electronic control unit (ECU) through an in-vehicle gateway (GW), and may control unmanned movement of the vehicle according to a vehicle driving signal received from the server 200. To this end, the OBD terminal 10 may include wired/wireless communication means, and a processor, a program, and a memory for vehicle control in a factory.

Figure 2:
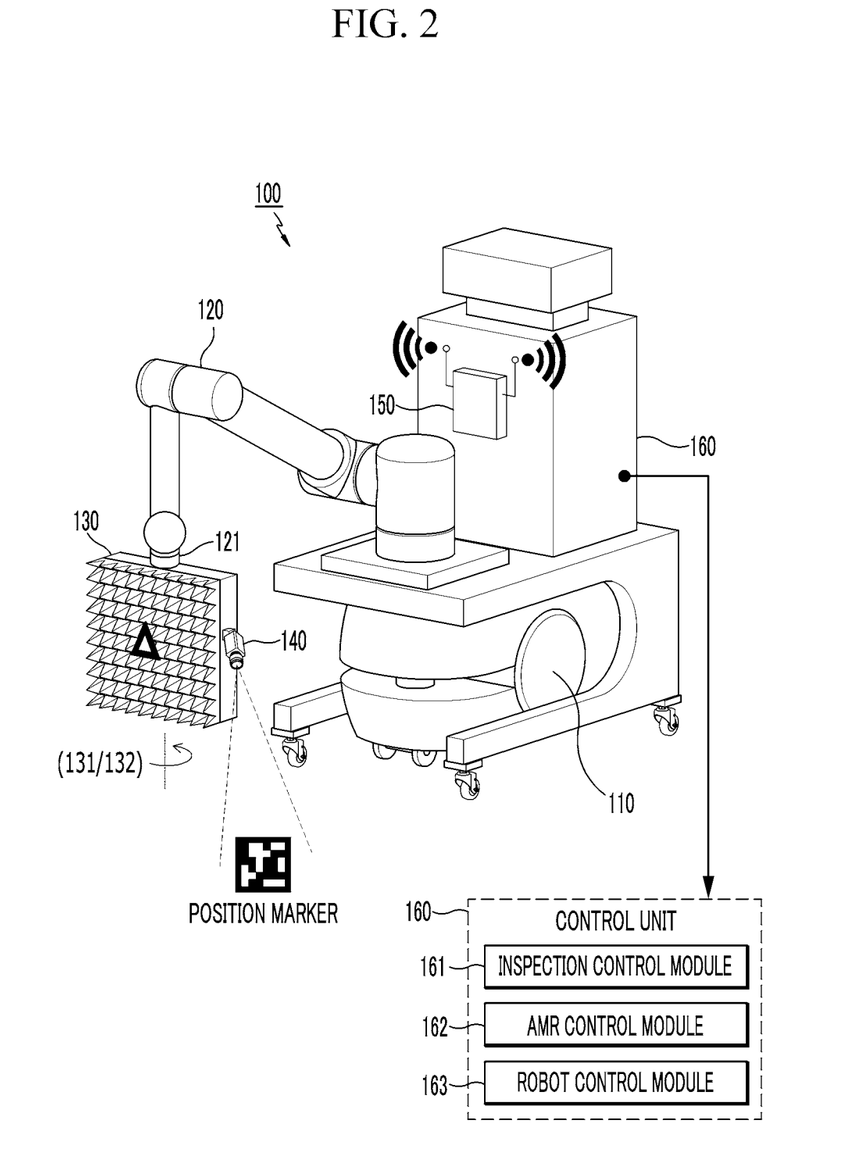
FIG. 2 schematically illustrates a configuration of an MMP according to an exemplary embodiment of the present disclosure.

The MMP 100 is a cooperative robot in which a manipulator 120 capable of changing a position of a calibration target unit 130 for ADAS inspection and an autonomous mobile robot (AMR) 110 supporting mobility thereof are integrally combined, and may be referred to as a "mobile calibration target" for ADAS inspection when collectively referred to as a functional aspect.

The MMP 100 moves to any one of the front, rear, and both sides around the vehicle and positions the mobile calibration target unit 130 to an inspection target position. Through this, the MMP 100 inspects mounting states of the ADAS sensors 11a and 11b installed in various positions around the vehicle, and corrects offset angles of the corresponding sensors. In this case, the ADAS sensor may include a function of self-calibrating the offset angle to a predetermined offset value.

The server 200 is a computing system that manages an operation of the ADAS inspection system using the MMP according to an exemplary embodiment of the present disclosure. For example, the server 200 may be an inspection device that controls all facilities provided in the ADAS inspection process or a manufacturing execution system (IVIES) that manages overall production in the vehicle factory.

The server 200 recognizes the entrance of the vehicle through the OBD terminal 10 connected to the access point (AP), and checks whether an inspection position of the vehicle is centered through a programmable logic controller (PLC) 210. The PLC 210 is in charge of centering control and may fix a centering state of the vehicle by applying physical pressure to a tire or the like.

The server 200 collects the vehicle information (ID) through the OBD terminal 10 and checks information on the ADAS sensor 11 applied according to the vehicle model/specification matched to the vehicle information (ID). For example, the vehicle information (ID) may be a vehicle identification number (VIN).

When the centering of the vehicle is completed, the server 200 transmits an ADAS inspection command including at least one of the vehicle information (ID) and the information on the ADAS sensor 11 applied according to the vehicle model/specification to the MMP 100.

In addition, the server 200 may receive an ADAS inspection result from the OBD terminal 10, store an inspection history by matching the corresponding vehicle information, and share the inspection history with an operator terminal 220.

Meanwhile, the mobile manipulator (MMP) 100 includes an autonomous mobile robot (AMR) 110, a manipulator 120, a calibration target unit 130, a vision sensor unit 140, a communication unit 150, and a control unit 160.

The AMR 110 is an autonomous driving mobile is for transporting goods or equipped with a manipulator 120 used for various purpose in a vehicle factory in which a smart factory is built.

The AMR 110 may include an autonomous driving sensor that detects surroundings for autonomous driving within the factory.

The AMR 110 may move to an inspection target point by itself while detecting the surroundings through the autonomous driving sensor, and avoid obstacles while moving.

The AMR 110 stores a factory map generated in advance by a simultaneous localization and mapping (SLAM)

method and a coordinate system (x, y, z) thereof, and uses the factory map and the coordinate system thereof to perform position detection and autonomous driving.

The manipulator 120 is a 6-axis multi joint robot and is coupled to the upper portion of the AMR 110.

The manipulator 120 may change attitude according to the control signal to move the calibration target unit 130 mounted on an end effector to a target position for inspecting the ADAS sensor of the vehicle.

Here, the calibration target unit 130 has a rectangular panel shape, and includes a calibration target 131 installed on one side and a calibration pattern 132 installed on the opposite side according to the ADAS inspection method and the type of sensor.

Accordingly, the manipulator 120 may be rotatably mounted with the calibration target unit 130 by rotating devices 121 and rotate the calibration target unit 130 by 180 degrees according to the ADAS inspection method and the type of sensor inspected at a current position of the AMR 110.

The vision sensor unit 140 scans a region of interest (ROI) marker in order to check a position deviation of the AMR 110 moved to the inspection target point. Here, the ROI marker is a physical resource required when the vision sensor unit 140 senses or detects an object in processing an image, and is a relative origin coordinate for calculating the position deviation of the AMR 110.

The vision sensor unit 140 includes at least one vision sensor, and may be attached to, for example, a side surface of the calibration target unit 130 mounted on the manipulator 120.

The communication unit 150 connects wireless communication with at least one of the OBD terminal 10 and the server 200 through the access point (AP).

The control unit 160 controls the overall operation of inspecting the mounting state for each position of the ADAS sensor applied to the vehicle by using the mobile calibration target mounted on the MMP 100 according to an embodiment of the present disclosure, and includes at least one program and data for such a purpose.

The control unit 160 includes an inspection control module 161, an AMR control module 162, and a robot control module 163 according to a control function.

The inspection control module 161 receives the vehicle information (ID) from the server 200 when the entrance of the vehicle into the inspection factory and the centering are completed.

The inspection control module 161 detects the ADAS function inspection item according to the vehicle model/specification matched to the vehicle information (ID) and movement information of the calibration target unit 130 corresponding to the corresponding ADAS sensor. To this end, the control unit 160 may store the movement information of the calibration target unit 130 according to the mounting position, number, and specification of the ADAS sensor matched according to the vehicle model/specification in advance.

In addition, the inspection control module 161 interlocks the AMR control module 162 and the robot control module 163 according to an ADAS inspection algorithm using the MMP 100 to integrally control the operations of the AMR 110 and the manipulator 120.

When the AMR control module 162 receives the movement information of the calibration target unit 130 from the inspection control module 161, the AMR control module 162 moves the AMR 110 to the received target point. The AMR 110 may move within a range capable of recognizing the ROI marker displayed on the target point. In this case, the AMR 110 that has moved to the target point may have a position deviation depending on the manufacturer. For example, AMR used during the POC may have a position deviation of 100 mm.

Accordingly, the AMR control module 162 may derive a final target position value by compensating for the position deviation identified through the vision sensor unit 140 and transmit the final target position value to the robot control module 163.

The robot control module 163 moves the calibration target unit 130 to the final target position by controlling kinematic attitude of the manipulator 120 with the final target position value received from the AMR control module 162. In this case, the robot control module 163 may selectively set the calibration target 131 or the calibration pattern 132 by operating the rotating devices 121 according to the ADAS inspection method and the type of the ADAS sensor.

Here, in the present disclosure, the method of compensating for the position deviation may be implemented in various exemplary embodiments as follows according to the components of the vision sensor unit 140.

For example, according to a first exemplary embodiment, the vision sensor unit 140 may include vision sensors installed for each X, Y, and Z axis, and compensate for the positional deviation of the AMR 110 through the vision sensors. This is a method of correcting the 6-axis position (X, Y, Z, Yaw, Pitch, Roll) by installing a vision sensor for each axis (X, Y, Z) to compensate for the position deviation of the AMR.

In this case, the control unit 160 may perform a position deviation calibration procedure including a step of moving the AMR 110 to a specific target point, a step of recognizing the ROI and compensating for the position deviation of the AMR, and a step of moving the calibration target unit 130 to the final target position by controlling the manipulator 120 with the compensated final target position value.

In addition, according to a second exemplary embodiment, the vision sensor unit 140 may include vision sensors installed on two axes of the X, Y, and Z axes, and compensate for the positional deviation of the AMR 110 through the vision sensors. This is a method of correcting the 6-axis position (X, Y, Z, Yaw, Pitch, Roll) after calculating an angle by installing the vision sensor on the two axes to compensate for the position deviation of the AMR.

In this case, the control unit 160 may perform a position deviation calibration procedure including a step of moving the AMR 110 to a specific target point, a step of recognizing the ROI of the two axes and compensating for the position deviation of the AMR, and a step of moving the calibration target unit 130 to the final target position by controlling the manipulator 120 with the compensated final target position value.

In addition, according to a third exemplary embodiment, the vision sensor unit 140 includes 2D and 3D vision sensors, and may correct the 6-axis axis position (X, Y, Z, Yaw, Pitch, Roll) by utilizing 3D vision after being moved to a position that may be recognized by the 3D vision utilizing 2D vision when the 2D and 3D field of view (FOV) is not sufficient.

In this case, the control unit 160 may perform a position deviation calibration procedure including a step of moving the AMR 110 to a specific target point, a step of recognizing the ROI with the 2D vision, a step of compensating for the position deviation of the AMR by moving to the position that may be recognized by the 3D vision, and a step of moving the calibration target unit 130 to the final target position by controlling the manipulator 120 with the compensated final target position value.

In addition, according to a fourth exemplary embodiment, the vision sensor unit 140 includes a 3D vision sensor, and may correct the 6-axis axis position (X, Y, Z, Yaw, Pitch, Roll) by utilizing 3D vision after moving the position deviation of the AMR to a position that may be recognized by the 3D vision sensor when the 3D field of view (FOV) is sufficient.

In this case, the control unit 160 may perform a position deviation calibration procedure including a step of moving the AMR 110 to a specific target point, a step of recognizing a 3D-shaped target, a step of compensating for the position deviation of the AMR using the 3D vision, and a step of moving the calibration target unit 130 to the final target position by controlling the manipulator 120 with the compensated final target position value.

The respective modules 161, 162, and 163 of the control unit 160 may be implemented as one or more processors operating according to a set program, and the set program may be programmed to perform the respective steps of the method for inspecting the ADAS using the MMP according to an exemplary embodiment of the present disclosure.

In addition, the components of the MMP 100 according to the exemplary embodiments of the present disclosure described above with reference to the drawings may be integrated or subdivided according to functions, and thus regardless of the name, it is clarified that the component performing the above-described function may be the configuration of the MMP 100 according to the exemplary embodiment of the present disclosure. Therefore, in the description of the method for inspecting the ADAS using the MMP according to the exemplary embodiment of the present disclosure, each step will be described with the MMP 100 as the subject, not the corresponding components.

Hereinafter, the method for inspecting the ADAS using the MMP will be described in detail with reference to FIGS. 3 and 4.

Figure 3:
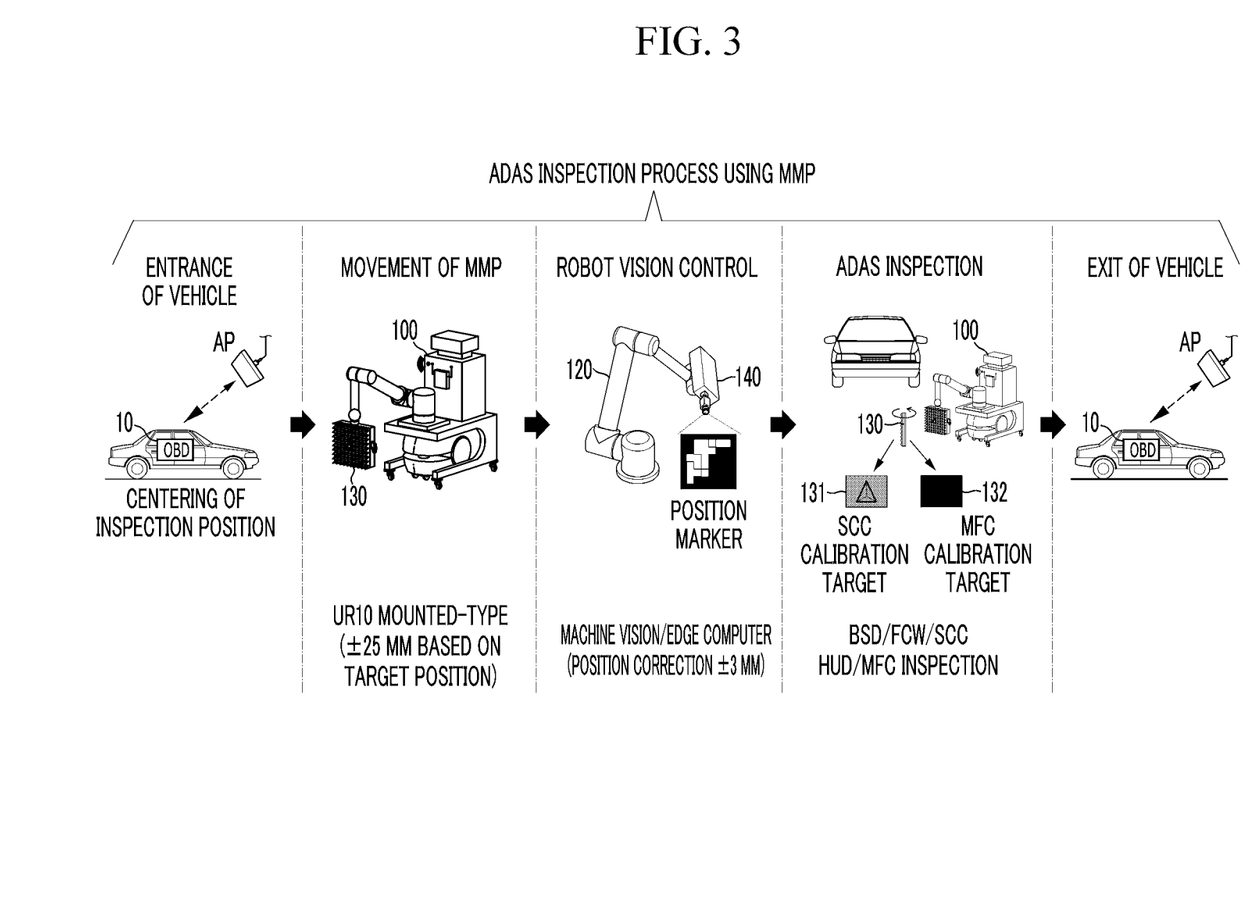
FIGS. 3 and 4 are flowcharts illustrating a method for inspecting an ADAS using an MMP according to an exemplary embodiment of the present disclosure.
Figure 4:
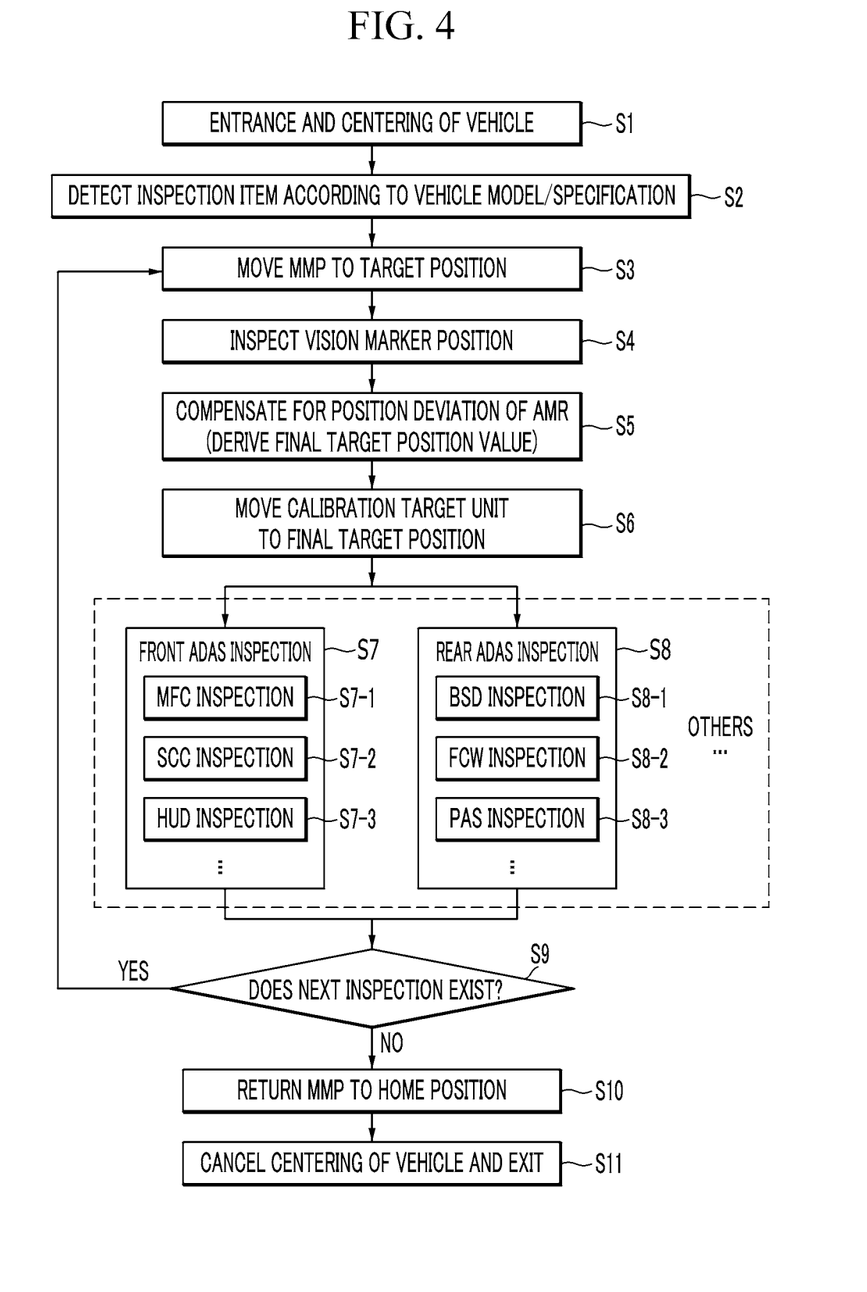

FIGS. 3 and 4 are flowcharts illustrating a method for inspecting an ADAS using an MMP according to an exemplary embodiment of the present disclosure.

Referring to FIGS. 3 and 4, when the vehicle enters an ADAS inspection process and centering is completed while the MMP 100 is on standby at a home position, the MMP 100 receives an ADAS inspection command including vehicle information (ID) from the server 200 that recognizes the entrance of the vehicle and the completion of centering at S1.

The MMP 100 detects an ADAS inspection item according to the vehicle model/specification of the vehicle information (ID) at S2, and moves to an inspection target point through the AMR 110 at S3.

Hereinafter, for convenience of explanation, a scenario in which the MMP 100 first moves to the front of the vehicle to perform a front ADAS inspection and then moves to the rear of the vehicle to perform a rear ADAS inspection will be described.

When the MMP 100 arrives at the target point for the front ADAS inspection of the vehicle, the MMP 100 scans an ROI marker through the vision sensor unit 140 at S4.

The MMP 100 derives a final target position value for attitude control of the manipulator 120 by compensating for a position deviation of the AMR based on an origin coordinate recognized through the ROI marker at S5. Here, as the method of compensating for the position deviation of the AMR, the method of compensating for the position deviation of any one of the various exemplary embodiments (the first to fourth exemplary embodiments) may be applied according to the components of the vision sensor unit 140 described above.

The MMP 100 moves the calibration target unit 130 to the final target position through attitude control of the manipulator 120 based on the final target position value at S6. In this case, the MMP 100 may selectively position the calibration target 131 or the calibration pattern 132 by operating the rotating devices 121 of the manipulator 120 according to the ADAS inspection method and the type of the ADAS sensor.

First, the MMP 100 may perform a front ADAS inspection in a state of being positioned in front of the vehicle at S7.

For example, the front ADAS inspection may sequentially perform an MFC inspection step at S7-1, an SCC inspection step at S7-2, and a HUD inspection step at S7-3 according to the inspection items.

Each of the inspection steps may be performed as a process of correcting an error of the ADAS sensor after controlling (operating) the corresponding ADAS function in the OBD terminal 10 of the vehicle according to the command of the server 200 in a state where the MMP 100 positions the calibration target unit 130 at the final target position of the inspection.

In addition, when an inspection position of a specific ADAS sensor is out of an operating range of the manipulator 120 during each inspection step (e.g., when the sensor is positioned at the front left and right diagonal lines), the movement of the AMR 110 is required, and therefore, the MMP 100 may set the calibration target unit 130 after moving to a next target point by performing the steps S3 to S6.

Since the rear ADAS inspection of the vehicle exists after completing the front ADAS inspection at S9; Yes, the MMP 100 returns to the step S3 and moves to the target point for the rear ADAS inspection of the vehicle, and then performs the steps S4 to S6.

In addition, the MMP 100 may perform the rear ADAS inspection in a state positioned at the rear of the vehicle at S8.

For example, the rear ADAS inspection may sequentially perform a BSD inspection step at S8-1, an FCW inspection step at S8-2, a PAS inspection step at S8-3, and the like according to the inspection items, and as described above, the OBD terminal 10 of the vehicle controls the corresponding ADAS function.

Thereafter, if the next inspection item of the vehicle exists after completing the rear ADAS inspection (e.g., the ADAS sensors are further present on both sides of the vehicle), the MMP 100 may return to step S3 to further perform the remaining inspections as described above.

On the other hand, if the next inspection does not exist at S9; No, the MMP 100 returns the calibration target unit 130 to its original position through the manipulator 120, returns to the home position through the AMR 110, and waits for the next inspection task at S10.

In this case, if the MMP 100 transmits a home position arrival signal to the server 200, the centering of the vehicle is canceled and the vehicle exits from the ADAS inspection process at S11.

In the method for inspecting the ADAS using the MMP described above, it is assumed that the rear ADAS inspection is performed after the front ADAS inspection of the vehicle, but it is obvious that the order of the inspection is not limited thereto and may be changed according to process design/efficiency. In addition, the type of ADAS inspection step is also not limited to the above, and may be added or omitted depending on the inspection item according to the vehicle model/specification.

As described above, according to an embodiment of the present disclosure, by implementing the system for inspecting the ADAS through the mobile calibration target using the MMP, a flexible operation is possible without restrictions on the position and space, and it is possible to shorten the construction period and reduce costs.

Further, by selectively providing a calibration target and a calibration pattern using one MMP without complex frame facilities and calibration target fixing structures, it is possible to secure smart factory element technology that may simplify the facilities and flexibly respond to various ADAS inspections for each vehicle model/specification.

The exemplary embodiments of the present disclosure described above are not implemented through only the apparatus and/or the method described above, but may also be implemented through programs executing functions corresponding to configurations of the exemplary embodiments of the present disclosure, a recording medium in which the programs are recorded, and the like. In addition, these implementations may be easily made by those skilled in the art to which the present disclosure pertains from the exemplary embodiments described above.

Although the exemplary embodiment of the present disclosure has been described in detail hereinabove, the scope of the present disclosure is not limited thereto. That is, several modifications and alterations made by a person of ordinary skill in the art using a basic concept of the present disclosure as defined in the claims fall within the scope of the present disclosure.

The invention claimed is:

1. A system for inspecting an advanced driver assistance system (ADAS) using a mobile manipulator (MMP), the system comprising:
   the MMP including an autonomous mobile robot (AMR) integrally coupled to a manipulator having a calibration target unit mounted thereon, the manipulator being configured to change a position of the calibration target unit to inspect the ADAS of a vehicle; and
   a server that transmits an ADAS inspection command to the MMP through an access point when the vehicle entering an inspection process is recognized and a centering of the vehicle is completed,
   wherein the MMP inspects a mounting state of an ADAS sensor by moving the calibration target unit to a target position while moving to at least one of the front, rear and both sides of the vehicle according to the ADAS inspection command;
   wherein the MMP includes:
      the AMR that moves to the target position by itself while detecting the surroundings through an autonomous driving sensor;
      the manipulator for moving the calibration target unit to the target position by changing positions according to a control signal;
      a vision sensor unit for scanning a region of interest (ROI) marker to check a position deviation of the AMR moved to a target point;
      a communication unit enabling wireless communication with at least one of the OBD terminal and the server through the access point; and
      a control unit for inspecting a mounting state for each position of the ADAS sensor applied to the vehicle using the calibration target unit;
   wherein the control unit includes:
      an inspection control module for identifying an ADAS inspection item according to the vehicle model and specification matched with the vehicle information (ID) and movement information of the calibration target unit corresponding to the corresponding ADAS sensor;
      an AMR control module for moving the AMR to the target point when receiving the movement information of the calibration target unit from the inspection control module; and
      a robot control module for moving the calibration target unit to a final target position by controlling the position of the manipulator with a final target position value received from the AMR control module; and
   wherein the AMR control module derives the final target position value acquired by compensating for the position deviation checked through the vision sensor unit and transmits the final target position value to the robot control module.

2. The system of claim 1, wherein the server recognizes the entrance of the vehicle through an on board diagnostic (OBD) terminal connected to the access point and checks whether an inspection position of the vehicle is centered through a programmable logic controller (PLC).

3. The system of claim 2, wherein the server collects vehicle information (ID) through the OBD terminal and checks information on the ADAS sensor applied according to the vehicle model/specification matched to the vehicle information (ID).

4. The system of claim 1, wherein the calibration target unit includes a calibration target installed on one side of a rectangular panel and a calibration pattern installed on an opposite side according to an ADAS inspection method and the type of the ADAS sensor.

5. The system of claim 4, wherein the manipulator is rotatably mounted with the calibration target unit by a plurality of rotating devices.

6. The system of claim 1, wherein the vision sensor unit includes at least one vision sensor, and is attached to a side surface of the calibration target unit.

7. A method for inspecting an advanced driver assistance system (ADAS) using a mobile manipulator (MMP) being coupled to a manipulator having a calibration target unit mounted thereon, wherein the manipulator changes a position of the calibration target unit mounted to inspect the ADAS of a vehicle, and being coupled to an autonomous mobile robot (AMR), the method comprising:
   a) receiving vehicle information (ID) of a vehicle in which centering is completed by entering an inspection process from a server;
   b) detecting an ADAS inspection item according to a model and specification of the vehicle information (ID), and moving to a target point through the AMR;
   c) deriving a final target position value by compensating for a position deviation of the AMR based on an origin coordinate recognized by scanning a region of interest (ROI) marker through a vision sensor unit when arriving at the target point; and
   d) inspecting a mounting state according to an operation of the ADAS sensor after moving the calibration target unit by controlling attitude of the manipulator with the final target position value.

8. The method of claim 7, wherein the compensating for the position deviation of the AMR in step c) includes:
   when the vision sensor unit includes vision sensors positioned on two axes among X, Y, and Z axes, compensating for a 6-axis position (X, Y, Z, Yaw, Pitch, Roll) through the vision sensor of each axis.

9. The method of claim 7, wherein the compensating for the position deviation of the AMR in step c) includes:
when the vision sensor unit includes vision sensors installed on two axes among X, Y, and Z axes, compensating for a 6-axis position (X, Y, Z, Yaw, Pitch, Roll) after calculating a specific position and angle through the vision sensors of the two axes.

10. The method of claim 7, wherein the compensating for the position deviation of the AMR in step c) includes:
when the vision sensor unit includes 2D and 3D vision, compensating for a 6-axis position (X, Y, Z, Yaw, Pitch, Roll) using the 3D vision after moving to a position recognized by the 3D vision by using the 2D vision when the field of view of the 2D and 3D vision is not sufficient.

11. The method of claim 7, wherein the compensating for the position deviation of the AMR in step c) includes:
when the vision sensor unit includes a 3D vision sensor, compensating for a 6-axis position (X, Y, Z, Yaw, Pitch, Roll) using the 3D vision after moving to a position recognized by the 3D vision sensor.

12. The method of claim 7, wherein step d) includes selectively positioning a calibration target or a calibration pattern of the calibration target unit by operating rotating devices of the manipulator according to the corresponding ADAS inspection method and the type of the ADAS sensor.

13. The method of claim 7, wherein step d) includes performing a front ADAS inspection including at least one of a multi-function camera (MFC) inspection step, a smart cruise control inspection (SCC) inspection step, and a head up display (HUD) inspection step according to the inspection item in a state of being positioned in front of the vehicle.

14. The method of claim 13, further comprising;
after the performing of the front ADAS inspection, performing a rear ADAS inspection including at least one of a blind spot detection (BSD) inspection step, a forward collision warning (FCW) inspection step, and a parking assist system (PAS) inspection step according to the inspection item after moving to a target point for ADAS inspection of a rear of the vehicle.

15. A system for inspecting an advanced driver assistance system (ADAS) using a mobile manipulator (MMP), the system comprising:
the MMP including an autonomous mobile robot (AMR) integrally coupled to a manipulator having a calibration target unit mounted thereon, the manipulator being configured to change a position of the calibration target unit to inspect the ADAS of a vehicle; and
a server that transmits an ADAS inspection command to the MMP through an access point when the vehicle entering an inspection process is recognized and a centering of the vehicle is completed,
wherein the MMP inspects a mounting state of an ADAS sensor by moving the calibration target unit to a target position while moving to at least one of the front, rear and both sides of the vehicle according to the ADAS inspection command;
wherein the MMP includes:
the AMR that moves to a target position by itself while detecting the surroundings through an autonomous driving sensor;
the manipulator for moving the calibration target unit to the target position by changing positions according to a control signal;
a vision sensor unit for scanning a region of interest (ROI) marker to check a position deviation of the AMR moved to the target point;
a communication unit enabling wireless communication with at least one of the OBD terminal and the server through the access point; and
a control unit for inspecting a mounting state for each position of the ADAS sensor applied to the vehicle using the calibration target unit;
wherein the calibration target unit includes a calibration target installed on one side of a rectangular panel and a calibration pattern installed on an opposite side according to an ADAS inspection method and the type of the ADAS sensor; and
wherein the manipulator is rotatably mounted with the calibration target unit by a plurality of rotating devices.

* * * * *